United States Patent Office 3,415,908
Patented Dec. 10, 1968

3,415,908
METHOD OF PREPARING TRIALKYL PHOSPHATES
Nickolai Kirillovich Bliznjuk, Alexei Filippovich Kolomiets, Semen Ljvovich Varshavsky, Anatoly Alexandrovich Skladnev, Lev Petrovich Kofman, and Galina Vasiljevna Tkachenko, Moscow, and Boris Jakovlevich Libman and German Andreevich Novokrechshenov, Volgograd, U.S.S.R., assignors to Vsesojuzny Nauchno-Issledovatelsky Institute Fitopatologii, U.S.S.R.
No Drawing. Filed May 7, 1964, Ser. No. 365,786
10 Claims. (Cl. 260—971)

ABSTRACT OF THE DISCLOSURE

A process for preparing trialkyl phosphates of the formula $(RO)_3PO$, wherein R is an alkyl group of 1 to 12 carbon atoms. Phosphorous, either red or white, is suspended in the corresponding alcohol in a molar ratio of 1:2–100 and the suspension is chlorinated with chlorine gas at a temperature of 10°–100° C. The reaction may be conducted in an inert solvent.

This invention relates to the synthesis of organic compounds, particularly organic compounds containing phosphorus, namely a method of preparing trialkyl phosphates.

Trialkyl phosphates belong to a class of compounds the uses of which are growing year by year. They are widely used in the capacity of solvents, plasticizers, selective solvents for the extraction of heavy metals, for example, uranium, additives to lacquers, polymerization catalysts, stabilizers for rubber, flame retardants, and hydraulic fluids.

Phosphates are also known to be used in the capacity of insecticides and as intermediates for the synthesis of the latter. Tributyl phosphate is one of the most active desiccants for woody plants. Recently several phosphates have begun to be used in the capacity of stabilizers for parathion (thiophos), and also as synergists of several herbicides and chlorine-containing organic insecticides.

The great practical significance of phosphates has resulted in widespread research in the development of simple and economical methods for their synthesis.

Until recently, trialkyl phosphates were obtained by the reaction of phosphorus oxychloride with alcohols, by the reaction of phosphorus pentachloride with alcohols, by the oxidation of trialkyl phosphites and by the reaction of ethers with phosphorus pentachloride.

All the methods enumerated above, with the exception the first, are of no interest for industrial production because of the scarcity and relative high cost of the starting materials, as well as the complexity of the technological processes (the use of high pressure, for example, in the reaction of ethers with phosphorus pentachloride).

The industrial method uses the reaction of phosphorus oxychloride with alcohols:

$$POCl_3 + 3ROH \rightarrow (RO)_3PO + 3HCl$$

For this reason, most research has been devoted to the study of this reaction.

The aim of this research has been to reduce to a minimum side-reactions, since the reaction of phosphorus oxychloride with alcohols is accompanied by the dealkylation of the phosphate due to the action of hydrogen chloride, resulting in acid phosphates; the acid phosphates in turn, are liable to reaction with phosphorus oxychloride and chlorophosphates with the formation of pyro- and polyphosphates.

For example:

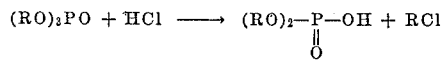

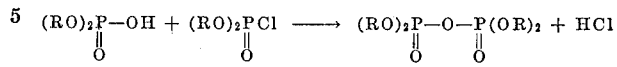

In order to remove the dealkylating agent hydrogen chloride, from the reaction site it has been proposed that an inert gas be passed through the reaction mixture or that the reaction be carried out in a solvent in which the hydrogen chloride is poorly soluble, for example, methylene chloride. In order to facilitate the reaction of the phosphorus oxychloride with alcohols, various catalysts are recommended: hydrogen fluoride, boron trifluoride, aluminium trichloride, zinc chloride and others.

However, even under these conditions, the preparation of trialkyl phosphates in good yields is not successful in the majority of cases without a hydrogen chloride acceptor. This reaction is not at all applicable for the preparation of lower phosphates, which under the influence of hydrogen chloride are especially liable to hydrolysis. For this reason, the lower phosphates are obtained by applying this reaction with the use of hydrogen chloride acceptors, for example, tertiary amines, or in place of alcohols, alcoholates are used, which considerably complicate the process.

Numerous attempts to overcome the above-mentioned disadvantages so far as we know, have not met with complete success in realizing a trialkyl phosphate synthesis applicable on an industrial scale.

In the search for simple and economical methods for the preparation of trialkyl phosphates we have earlier shown that these products are obtained in good yields by the reaction of alcohols with phosphorus trichloride and chlorine:

$$4ROH + PCl_3 + Cl_2 \rightarrow (RO)_3PO + RCl + 4HCl$$

It has now been established that trialkylphosphates are obtained in good yields by an even simpler method in which readily available and inexpensive starting materials are used, namely, alcohols, elemental phosphorus and chlorine:

$$2P + 5Cl_2 + 8ROH \rightarrow 2(RO)_3PO + 8HCl + 2RCl$$

wherein R is an alkyl group of 1 to 12 carbon atoms.

The proposed method of preparing trialkyl phosphates consists in chlorinating a suspension of elemental phosphorus in alcohol with a stoichiometric or excess quantity of chlorine.

The reaction may be carried out at a temperature of 10–100° C. either in organic solvents or without them. The yield of trialkyl phosphate comes to as much as 90% or more.

The object of the present invention is to provide a simple and economical method for the preparation of trialkyl phosphates, which is industrially practicable. Another object of the invention is to provide a universal method which can be used successfully in the synthesis of both lower and higher trialkyl phosphates. The invention provides for the preparation of trialkyl phosphates from inexpensive and available raw materials, which are produced in large quantities, and also ensures high yields of the desired products. The proposed method is free from the disadvantages inherent in earlier known methods of producing trialkyl phosphates.

The essence of the method consists in the following: A stoichiometric amount or a slight excess of chlorine is bubbled through a suspension of red or white phosphorus in alcohol, either in the presence of an inert organic solvent like carbon tetrachloride, methylene chloride and others, or without a solvent, with good stirring and cooling. The hydrogen chloride which is formed in the reaction is removed by blowing dry air or an inert gas through the mixture, and the trialkyl phosphate is separated by known methods.

The yield of trialkyl phosphate is increased by the use of an excess of alcohol, and also be the use of solvents.

When only the stoichiometric quantity of alcohol is used the by-products formed are dialkyl phosphates, tetraalkyl pyrophosphates, and dialkyl chlorophosphates. The last two compounds are readily converted to dialkyl phosphates by treatment with water and in this way the technical product will consist of trialkylphosphates with dialkyl phosphate impurities.

Those skilled in this art will understand that by using a deficiency of alcohol and treating the reaction mixture with water, mixtures of tri- and dialkyl phosphates may be obtained in different proportions. Such technical products also may find practical application, for example, in the extraction of heavy metals from ore, since not only trialkyl but also dialkyl phosphates are effective in forming coordination compounds.

The alkyl chlorides which are formed as by-products in the proposed process are valuable products for organic synthesis. They are readily separated from the reaction mixture by distillation.

Of all possible variants in realizing the process the preferred way of carrying out the reaction uses red phosphorus and an excess of alcohol in an inert organic solvent which has a boiling point of 30–50° C.

In order that those skilled in the art may better understand the invention, the following examples are given as illustrations.

Example 1.—Preparation of tributyl phosphate

Into a suspension of red phosphorus in n-butyl alcohol, the latter being in 100% excess of the calculated amount, chlorine is bubbled with careful stirring and cooling, keeping the temperature of the reaction mixture between 35° and 45° C. After introducing the theoretical quantity of chlorine into the mixture, almost all the phosphorus dissolves and the solution becomes transparent.

In order to make up for a small loss because of nonabsorption, a small excess (5%–10%) of chlorine is used. The reaction mixture is kept at the same temperature for 15 to 20 minutes after which dry air is passed through it for a period of 3 hours. Anhydrous sodium or potassium carbonate is added to the residue in sufficient quantity to completely neutralize the acid products (it is better to use an excess quantity of carbonate). The mixture is stirred for 15 to 20 minutes and the excess alcohol is then distilled off under a pressure of 20–30 mm. and the tributyl phosphate then separated by fractional distillation (B.P. 138°–140° C. at 4 mm.); in the literature the boiling point is given as 160–162° at 15 mm., and 143–144° at 8 mm. Yield 86%.

Example 2.—Preparation of tributyl phosphate

The synthesis is carried out as in Example 1, but white phosphorus is used as starting materials. In this case the reaction is more exothermic and therefore requires better cooling.

The results are similar to those in Example 1.

On carrying out the reaction according to Example 1 but using methylene chloride as solvent, tributyl phosphate was obtained in 94% yield; using carbon tetrachloride as solvent gave a yield of 92% and using butyl chloride as solvent gave a yield of 91%.

Example 3.—Preparation of triamyl phosphate

Using the method of Example 1, but starting with n-amyl alcohol, red phosphorus and chlorine in the molar proportions of 8:1:2.6 respectively, triamyl phosphate was obtained B.P. 162–165 C. at 7 mm.; in the literature the boiling point is given at 158–163 (6 mm.). Yield 84.5%.

Example 4.—Preparation of triethyl phosphate

Using the method of Example 1, triethyl phosphate was obtained with a yield of 79%; B.P. 98–100° C. (9 mm.); in the literature the boiling point is given at 98–98.5° C. (8 mm.).

The reaction and subsequent working up of the mixture was carried out at a temperature of 20–25° C.

Example 5.—Preparation of trioctyl phosphate

Using the method of Example 1, and starting with red phosphorus and a 100% excess of n-octyl alcohol an 86% yield of trioctyl phosphate was obtained; B.P. 225–230° C. (5 mm.).

Using trioctyl alcohol, red phosphorus and chlorine in a molar ratio of 4.4:1:2.6 respectively, trioctyl phosphate was obtained in a yield of 81%.

Example 6

Using the method of Example 1 phosphates were prepared starting with alcohols obtained by the oxo-synthesis. The approximate composition of the products obtained from red phosphorus, chlorine and oxo-synthesis alcohols under different condition is given in Table 1, below. The analysis was performed after removal of hydrogen chloride by blowing dry air through the reaction mixture.

| Alcohol fraction from oxosynthesis | Molar ratio of phosphorus to alcohol | Reaction temp., °C. | Approximate composition of the reaction mixture, percent ||||||
|---|---|---|---|---|---|---|---|---|
| | | | Trialkyl phosphates | Dialkyl phosphates | Tetralkyl phosphates | Dialkyl chlorophosphates | Alkyl chlorides | Alcohols |
| $C_7$–$C_9$ | 1:4.8 | 30 | 52.1 | 7.3 | 3.1 | 1.5 | 21.0 | 15.0 |
| $C_7$–$C_9$ | 1:4.8 | 40 | 51.4 | 7.9 | 1.9 | 2.8 | 21.5 | 14.5 |
| $C_7$–$C_9$ | 1:4.0 | 40 | 55.0 | 9.9 | 5.0 | 4.3 | 23.8 | 2.0 |
| $C_{10}$–$C_{12}$ | 1:4.0 | 40 | 55.1 | 7.2 | 4.9 | 6.6 | 23.9 | 2.3 |

Although a specific embodiment of the invention has been disclosed in this description, it should be understood that there may be various changes and modifications without departing from the spirit of the invention and the scope of the appended claims, as those skilled in the art will readily appreciate.

What we claim is:

1. A method for the preparation of trialkyl phosphates from phosphorous, chlorine and alcohols, said method comprising adding elemental phosphorous to at least one alcohol of the formula ROH wherein R is an alkyl group of 1 to 12 carbon atoms, said elemental phosphorous and alcohol being present in a molar ratio of 1:2–100 to form a suspension and chlorinating the suspension with chlorine gas at a temperature of 10°–100° C. to form a trialkyl phosphate of the formula $(RO)_3PO$ wherein R is as defined above.

2. A method as claimed in claim 1 wherein the elemental phosphorous and the alcohol are present in a molar ratio of 1:4–20.

3. A method as claimed in claim 1 wherein the elemental phosphorous and the alcohol are present in a molar ratio of 1:20.

4. A method as claimed in claim 1 comprising adding to the suspension an inert solvent.

5. A method as claimed in claim 4 wherein the solvent is methylene chloride or carbon tetrachloride.

6. A method as claimed in claim 1 wherein chlorination is effected with at least the stoichiometric amount of chlorine.

7. A method as claimed in claim 1 wherein chlorination is effected at a temperature of 20°–70° C.

8. A method as claimed in claim 1 wherein chlorination is effected at a temperature of 20°–25° C.

9. A method as claimed in claim 1 wherein the alcohol is n-butyl alcohol, n-amyl alcohol, ethyl alcohol or n-octyl alcohol.

10. A method as claimed in claim 1 wherein said at least one alcohol comprises a mixture of alcohols of seven to twelve carbon atoms.

No references cited.

CHARLES B. PARKER, *Primary Examiner.*

JOSEPH P. BRUST, *Assistant Examiner.*

U.S. Cl. X.R.

260—963